(12) United States Patent
Harata

(10) Patent No.: US 8,612,089 B2
(45) Date of Patent: Dec. 17, 2013

(54) ON-VEHICLE FAULT DETECTING DEVICE

(75) Inventor: Yuzo Harata, Chiryu (JP)

(73) Assignee: Denso Corporation, Kariya (JP)

( * ) Notice: Subject to any disclaimer, the term of this patent is extended or adjusted under 35 U.S.C. 154(b) by 562 days.

(21) Appl. No.: 12/928,882

(22) Filed: Dec. 21, 2010

(65) Prior Publication Data

US 2011/0160934 A1   Jun. 30, 2011

(30) Foreign Application Priority Data

Dec. 25, 2009   (JP) .................................. 2009-293868

(51) Int. Cl.
*G06F 11/07* (2006.01)
*G01M 17/00* (2006.01)

(52) U.S. Cl.
CPC ............. *G06F 11/076* (2013.01); *G01M 17/00* (2013.01)
USPC ........... 701/31.7; 701/33.7; 701/34.4; 714/25

(58) Field of Classification Search
USPC .......................................................... 701/31
See application file for complete search history.

(56) References Cited

U.S. PATENT DOCUMENTS

| | | | |
|---|---|---|---|
| RE31,582 E * | 5/1984 | Hosaka et al. ................. | 701/102 |
| 6,115,656 A * | 9/2000 | Sudolsky ...................... | 701/33.4 |
| 6,167,338 A * | 12/2000 | De Wille et al. ............... | 701/51 |
| 6,259,168 B1 | 7/2001 | Okada | |
| 7,647,145 B2 * | 1/2010 | Eickhoff et al. .............. | 701/31.3 |
| 8,118,122 B2 * | 2/2012 | Buur et al. ................ | 180/65.265 |
| 8,311,858 B2 * | 11/2012 | Everett et al. ................. | 705/4 |
| 2005/0162256 A1 | 7/2005 | Kinoshita | |
| 2005/0262394 A1* | 11/2005 | Yasukawa et al. .............. | 714/23 |
| 2007/0198874 A1* | 8/2007 | Watanabe ...................... | 714/49 |
| 2008/0065290 A1* | 3/2008 | Breed et al. ...................... | 701/29 |
| 2008/0183352 A1* | 7/2008 | Mizobuchi et al. ............. | 701/35 |
| 2009/0248238 A1 | 10/2009 | Itoh | |

FOREIGN PATENT DOCUMENTS

| | | | |
|---|---|---|---|
| JP | 2000-079868 | 3/2000 | |
| JP | 2002-24101 | 1/2002 | |
| JP | 2005-215788 | 8/2005 | |
| JP | 2007-156949 | 6/2007 | |
| JP | 2008-37194 | 2/2008 | |
| JP | 2008-111773 | 5/2008 | |
| JP | 2008-247217 | 10/2008 | |
| JP | 2009-227250 | 10/2009 | |
| WO | WO 9219046 A1 * | 10/1992 | ............. G11C 16/06 |

OTHER PUBLICATIONS

Office action dated Jan. 13, 2012 in corresponding Japanese Application No. 2009-293868.

* cited by examiner

*Primary Examiner* — Shelley Chen
(74) *Attorney, Agent, or Firm* — Harness, Dickey & Pierce, PLC

(57) ABSTRACT

There is disclosed an on-vehicle fault detecting device that can more accurately identify what has caused data different from intended-to-be-written data in a memory as a hardware fault. The IG-operation counting unit counts a number of ON-operations of the ignition (IG) switch. The usage-environment-change determining unit determines whether or not a number of times of continuous non-coincidence has reached a determination number, and presumes that the usage environment has changed if a number of continuous IG-switch operations has reached a determination number. Even in cases where the number of times of continuous non-coincidence has reached the determination number, the data writing unit will not write occurrence of a fault in hardware in the memory unless it is presumed by the usage-environment-change determining unit that the usage environment around the vehicle C has changed.

26 Claims, 7 Drawing Sheets

EXEMPLARY TEMPORARY ABNORMALITY

ON-VEHICLE FAULT DETECTING DEVICE

CROSS-REFERENCE TO RELATED APPLICATION

This application is based on and claims the benefit of priority from earlier Japanese Patent Application No. 2009-293868 filed Dec. 25, 2009, the description of which is incorporated herein by reference.

BACKGROUND

1. Technical Field

This invention relates to an on-vehicle fault detecting device that can detect an abnormality when data, such as wireless operation history of a mobile device and vehicle specification information, is written in or read from a memory.

2. Related Art

An on-vehicle fault detecting device as disclosed in Japanese Patent Application Publication No. 2002-24101 includes a power source IC, a main microcomputer, a sub-microcomputer, and an EEPROM (a nonvolatile memory). The power source IC is operative to output a reset signal to the main microcomputer when the power supply voltage drops below a predetermined reset voltage. Data is written in the EEPROM by the sub-microcomputer. In an ECU, a bottom operating voltage of the main microcomputer is set to be below the reset voltage, and a bottom operating voltage of the sub-microcomputer is set to be above the reset voltage. When the power supply voltage drops to the bottom operating voltage of the sub-microcomputer, the main microcomputer prohibits the sub-microcomputer from writing data in the EEPROM. This can prevent the sub-microcomputer from writing erroneous data in the EEPROM. Such erroneous writing is likely to occur when the power supply voltage drops to the bottom operating voltage of the sub-microcomputer.

Known on-vehicle fault detecting devices, including the device as disclosed in Japanese Patent Application Publication No. 2002-24101, prevent data different from intended-to-be-written data from being written in a nonvolatile memory (a storage unit), by means of well-known checking techniques, such as a parity-bit check, a checksum, an error-correcting code check, and verification.

Whereas, despite using the known techniques, it may not be ensured that the intended data is correctly written in the memory. In other words, data different from the intended data may be erroneously written in the memory.

As a solution to such a deficiency, there is known an on-vehicle fault detecting device that writes data in a memory, then reads the written data from the memory, and determines whether or not the read data is coincident with data intended to be written in the memory. In cases where it is determined that the read data is not coincident with the intended data, the data is again written in the memory. The fault detecting device counts a number of times that it is continuously (or consecutively) determined that the read data is not coincident with the intended data, and in cases where the number of times of continuous non-coincidence has reached a predetermined determination number of times of continuous non-coincidence (for example, two times), it will be written in the memory that there has occurred a fault in hardware or that there exists a fault in hardware.

This enables a user, such as maintenance personnel, to detect a fault in hardware (or a fault in a hardware component, such as EEPROM) itself by reading the occurrence of a fault in hardware from the memory through a dedicated tool. It should be noted, however, that the occurrence of a fault in hardware may fail to be written in the memory. In such cases, it is difficult to detect a hardware fault because of lack of the occurrence of a fault in hardware in the memory.

Even in cases where the number of times of continuous non-coincidence has reached the predetermined determination number, there may be cases where it cannot be concluded that there has occurred a hardware fault. Therefore, the on-vehicle fault detecting device may be configured to take appropriate control measures, such as outputting the occurrence of a fault in hardware directly to the dedicated tool or preventing the read data from being used, instead of writing the occurrence of a fault in hardware in the memory.

What causes data different from the intended data to be erroneously written in the memory may be considered to be not only a continuous abnormality, such as a fault in hardware (e.g., EEPROM) itself, but also a temporary abnormality that results from a usage environment around a vehicle equipped with the fault detecting device, such as an environment rich in strong radio waves emitted from a manufacturing facility or a transformer station or other sources.

The above known on-vehicle fault detecting devices are only operative to determine that there is a an abnormality in data in cases where the number of times of continuous non-coincidence has reached the determination number, and are not capable of identifying what has caused data different from intended data to be written in the memory. Therefore, even if a true cause of the fault is a usage environment around the vehicle, there will be written in the memory that there has occurred (or exists) a fault in the on-vehicle fault detecting device itself or in its hardware (EEPROM) itself, which will lead to an erroneous judgment.

It should be noted that such a situation may occur not only in writing data in a memory but also in reading written data from a memory.

SUMMARY

In consideration of the foregoing, exemplary embodiments of the present invention are directed to providing an on-vehicle fault detecting device that can more reliably and more accurately identify what has caused data different from intended data to be written in a memory or what has caused data different from data that should have been written in a memory to be read from the memory as a hardware fault.

In accordance with an exemplary aspect of the present invention, there is provided an on-vehicle fault detecting device for detecting whether or not there has occurred a fault in the device itself or in its hardware component, which comprises a data reading means for reading data written in a memory a coincidence-of-data determining means for determining whether or not data read by the data reading means from the memory is not coincident with predetermined data, wherein the device is operative to determine that there has occurred a hardware fault only in cases where the coincidence-of-data determining means determines that the read data is not coincident with the predetermined data, and a usage-environment-information acquiring means for acquiring information about a usage environment around a vehicle equipped with the device. The device further comprises a usage-environment-change determining means for determining whether or not the usage environment around the vehicle has changed on the basis of usage environment information acquired by the usage-environment-information acquiring means, while it is continuously determined by the coincidence-of-data determining means that the read data is not coincident with the predetermined data, wherein even in cases where the coincidence-of-data determining means has determined that the read data is not coincident with the predetermined data, the device is operative not to determine (or does not determine) that there has occurred a hardware fault unless the usage-environment-change determining means determines that the usage environment has changed.

In accordance with another exemplary aspect of the present invention, there is provided an on-vehicle fault detecting device for detecting whether or not there has occurred a fault in the device itself or in its hardware component, which comprises a data writing means for writing data in a memory, a data reading means for reading data written in the memory; and a coincidence-of-data determining means for determining whether or not the data read by the data reading means from the memory is not coincident with data intended to be written by the data writing means in the memory, wherein the device is operative to determine that there has occurred a hardware fault only in cases where the coincidence-of-data determining means determines that the read data is not coincident with the intended data to be written. The device further comprises a usage-environment-information acquiring means for acquiring information about a usage environment around a vehicle equipped with the device; and a usage-environment-change determining means for determining whether or not the usage environment around the vehicle has changed on the basis of usage environment information acquired by the usage-environment-information acquiring means, while it is continuously determined by the coincidence-of-data determining means that the read data is not coincident with the intended data to be written, wherein even in cases where the coincidence-of-data determining means has determined that the read data is not coincident with the intended data to be written, the device is operative not to determine that there has occurred a hardware fault unless the usage-environment-change determining means determines that the usage environment has changed.

Even in cases where the coincidence-of-data determining means has determined non-coincidence of data, what has caused data different from intended data to be written in a memory or what has caused data different from data that should have been written in a memory to be read from the memory in cases where the usage-environment-change determining means determines that the usage environment has changed may not be limited to a fault in the on-vehicle fault detecting device or in its hardware (e.g., EEPROM) itself, but may be a usage environment around the device. In other words, the true cause may not be a continuous abnormality such as a hardware fault.

However, in cases where the coincidence-of-data determining means determines non-coincidence of data and the usage-environment-change determining means determines that the usage environment around the vehicle has changed, it is highly probable that what has caused data different from intended data to be written in a memory or what has caused data different from predetermined data (i.e., data that should have been correctly written in a memory) to be read from the memory is not the usage environment around the on-vehicle fault detecting device but a fault in the device itself. In such cases, it is highly probable that there has occurred a continuous abnormality.

With the above configuration, even in cases where the coincidence-of-data determining means has determined non-coincidence of data, it is not be determined by the fault detecting device that there has occurred a hardware fault unless the usage-environment-change determining means determines that the usage environment has changed. This makes it possible to determine that there has occurred a hardware fault only in cases where there has occurred a continuous abnormality. Accordingly, it becomes possible to more reliably and more accurately identify what has caused data different from intended data to be written in a memory or what has caused data different from data that should have been written in a memory to be read from the memory as a hardware fault.

DESCRIPTION OF SPECIFIC EMBODIMENTS

The present inventions will be described more fully hereinafter with reference to the accompanying drawings. Like numbers refer to like elements throughout.

Figure 1A:
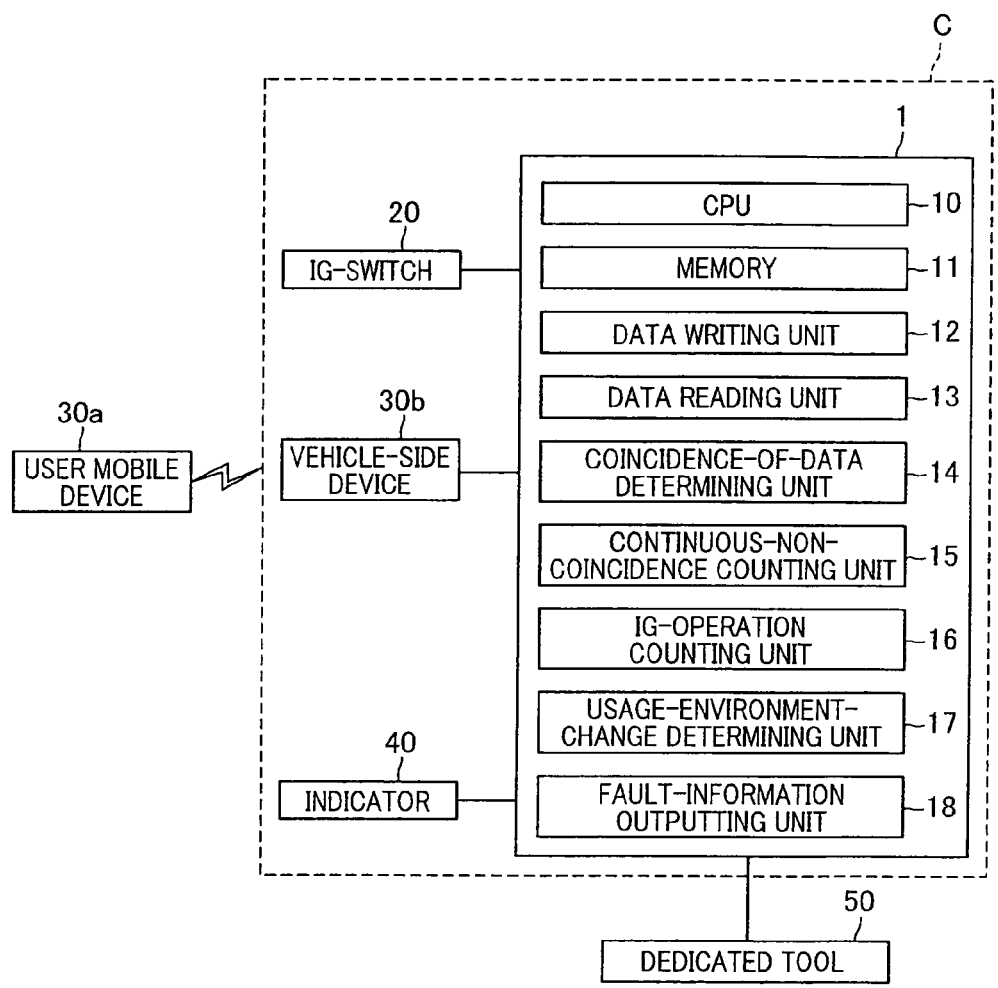
FIG. 1A is a block diagram schematically illustrating an on-vehicle fault detecting device in accordance with an embodiment of the present invention.

The on-vehicle fault detecting device 1, as shown in FIG. 1A, may be composed of a known computer including a known CPU 10 and a known embedded memory (not shown). The on-vehicle fault detecting device 1 implements various functions by the CPU 10 performing programs stored in the embedded memory. In the following, for the sake of description, the on-vehicle fault detecting device 1, as shown in FIG. 1A, comprises a memory (or a storage unit) 11, a data writing unit 12, a data reading unit 13, a coincidence-of-data determining unit 14, a continuous-non-coincidence counting unit 15, an IG-operation counting unit 16 as a usage-environment-information acquiring unit, a usage-environment-change determining unit 17, and a fault-information outputting unit 18.

A vehicle C is equipped with the on-vehicle fault detecting device 1. The vehicle C has an ignition switch (hereinafter, also referred to as an IG-switch) 20 for a vehicle user to instruct a vehicle engine (not shown) to start. The IG-switch 20 outputs an IG-signal indicative of ON/OFF-operation when turned on/off. The vehicle engine starts when receiving the IG-signal indicative of the ON-operation from the IG-switch 20. Also, the vehicle C may be equipped with an electronic key system comprising a user mobile device 30a and a vehicle-side device 30b that locks and unlocks a vehicle door (not shown) via a wireless communication between the user mobile device 30a and the vehicle-side device 30b. The user mobile device 30a may be provided with a lock button (not shown) for instructing the vehicle-side device 30b to lock the vehicle door and an unlock button (not shown) for instructing the vehicle-side device 30*b* to unlock the vehicle door. The vehicle C may also be provided with an indicator 40 that lights or blinks to alert the vehicle user or others to occurrence of a fault when it is detected by the on-vehicle fault detecting device 1. In addition, the vehicle C may be connectable to a dedicated tool 50 installed in, for example, a vehicle maintenance shop or the like, and then a maintenance personnel is allowed to read fault information stored in the on-vehicle fault detecting device 1 (particularly, the memory 11) by connecting the dedicated tool 50 to the vehicle C. It should be noted that the indicator 40 may be installed somewhere else other than in the vehicle C.

The memory 11 may be a non-volatile memory (e.g., EEPROM). As shown in FIG. 1E, and as will be described later, the memory 11 may include a storage area 111 for storing wireless operation information, a storage area 112 for storing fault information acquired by the on-vehicle fault detecting device 1, a storage area 113 for storing a counted number of times of continuous non-coincidence N1, a storage area 114 for storing a counted number of IG-operations N2, i.e., a counted number of times the IG-switch is turned on, and other storage areas as desired.

The data writing unit 12 is connected to the memory 11 and the vehicle-side device 30*b*. Each time the lock button or the unlock button on the user mobile device 30*a* is operated (e.g., turned or pushed or touched) to lock or unlock a vehicle door, the data writing unit 12 accesses the storage area 111 of the memory to write wireless operation information inputted by the vehicle-side device 30*b*. The wireless operation information may be stored in the memory 11 (particularly, in the storage area 111), for example, for the sake of identifying what has caused a fault in the electronic key system.

The data reading unit 13 is connected to the memory 11 and the data writing unit 12, and after the wireless operation information has been written in the memory 11 (particularly, in the storage area 111), accesses the storage area 111 to read the wireless operation information stored in the storage area 111.

The coincidence-of-data determining unit 14 is connected to the data writing unit 12, the data reading unit 13, the continuous-non-coincidence counting unit 15, and the usage-environment-change determining unit 17. The coincidence-of-data determining unit 14 is operative to determine whether or not the wireless operation information read by the data reading unit 13 is coincident with the wireless operation information intended to be written by the data writing unit 12. The coincidence-of-data determining unit 14 is then operative to output coincidence of data in cases where the read wireless operation information is coincident with the intended wireless operation information, and non-coincidence of data in cases where the read wireless operation information is not coincident with the intended wireless operation information, to the continuous-non-coincidence counting unit 15 and the usage-environment-change determining unit 17.

The wireless operation information as used herein refers to information about operations performed on the user mobile device 30*a*, such as the lock button having been turned on and the unlock button having been turned on, and results from operations performed by the vehicle device 30*b*, such as the vehicle door having been locked and the vehicle door having been unlocked.

In addition, the data writing unit 12, the data reading unit 13, and the coincidence-of-data determining unit 14 are adapted to implement well-known erroneous write checking techniques, such as a parity-bit check, a checksum, an error-correcting code check, and verification, to ensure that data intended to be written is actually and correctly written in the memory 11.

The wireless operation information intended to be written, however, may not be correctly written in the memory 11. In other words, wireless operation information different from the wireless operation information intended to be written may be actually written in the storage area 111 of the memory 11.

In consideration of such a situation, the on-vehicle fault detecting device 1 is operative to try again to write the intended wireless operation information in the memory 11 through the data writing unit 12 in cases where the intended wireless operation information has not been correctly written in the memory. In the following, there will now be described more fully such a retry process.

The continuous-non-coincidence counting unit 15 is connected to the memory 11 and the coincidence-of-data determining unit 14. In cases where the coincidence-of-data determining unit 14 determines that the read wireless operation information is not coincident with the intended wireless operation information and then outputs non-coincidence of data, then the continuous-non-coincidence counting unit 15 accesses the storage area 113 of the memory 11 to replace a value which has been stored in the storage area 113 by the value plus a predetermined value (e.g., "1"). On the other hand, in cases where the coincidence-of-data determining unit 14 determines that the read wireless operation information is coincident with the intended wireless operation information and then outputs coincidence of data, the continuous-non-coincidence counting unit 15 accesses the storage area 113 to replace a value which has been stored in the storage area 113 by an initial value (e.g., "0"). In this way, the continuous-non-coincidence counting unit 15 is operative to count a number of times N1 that the coincidence-of-data determining unit 14 continuously (or consecutively) determines that the read wireless operation information is not coincident with the intended wireless operation information.

Unless the number of times of continuous non-coincidence N1 stored in the storage area 113 of the memory 11 has reached a predetermined determination number N1th (e.g., "2"), the data writing unit 12 is operative to try again to write the wireless operation information in the storage area 111 of the memory 11 (a retry process). On the other hand, in cases where the number of times of continuous non-coincidence N1 has reached the determination number N1th, the data writing unit 12 is operative to write occurrence of a fault in hardware in the storage area 112 of the memory 11. In the present embodiment, the determination number of times of continuous non-coincidence N1th has been set at "2" (two times) as an example. In some embodiments, the determination number N1th may be "1" or "3 or more".

The fault-information outputting unit 18 is connected to the memory 11 and the indicator 40. When occurrence of a fault in hardware is written in the storage area 112 of the memory 11 as described above, the fault-information outputting unit 18 activates the indicator 40 to light or blink. When the dedicated tool 50 is connected to the on-vehicle fault detecting device 1, the dedicated tool 50 accesses the storage area 112 of the memory 11, and then reads the occurrence of a fault in hardware from the memory 11.

In this way, the on-vehicle fault detecting device 1 is operative to try again to write the wireless operation information in the memory 11 via the data writing unit 12 in cases where the intended wireless operation information has not been correctly written in the memory 11. In cases where there has occurred (or exists) a fault in the on-vehicle fault detecting device 1 itself, the indicator 40 is activated to light or blink.

Thus, the lit or blinking indicator 40 enables the vehicle user to know that there has occurred (or exists) a fault in the on-vehicle fault detecting device 1. In addition, a maintenance personnel connects the dedicated tool 50 to the on-vehicle fault detecting device 1, and then reads fault information from the memory 11 to check that there has occurred (or exists) a fault in the on-vehicle fault detecting device 1 itself.

What can cause wireless operation information different from intended wireless operation information to be written in the memory is not only a continuous abnormality, such as a fault in the on-vehicle fault detecting device 1 itself, but also a temporary abnormality, such as a usage environment around the vehicle (e.g., strong radio waves from a manufacturing facility or a transformer station or other sources).

Here will now be described an example of such a temporary abnormality with reference to FIG. 3. Under a usage environment S1 rich in strong radio waves, for example, in the neighborhood of a manufacturing facility or a transformer station or other sources emitting the strong radio waves, the vehicle door may probably fail to be unlocked even by the user operating the unlock button on the user mobile device 30*a*, so that the intended wireless operation information (i.e., that the vehicle door is unlocked) may not be correctly written in the memory 11. On the other hand, under a usage environment S2 without such strong radio waves, for example, in the neighborhood of a vehicle user's residence, the vehicle door will be successfully unlocked by operating the unlock button on the user mobile device 30*a*, so that the intended wireless operation information will be correctly written in the memory 11. This is merely an example of scenario where a temporary abnormality can happen.

Once a temporary abnormality has occurred, a vehicle user drives his vehicle to a dealer or the like to claim an abnormality in the vehicle (particularly, the vehicle fault detecting device). Despite there being no real fault in the vehicle fault detecting device itself, the dealer will be forced to process the claim, for example, by renewing the device with new one. Thus, such a temporary abnormality can lead to an increasing claim processing cost.

Figure 3:
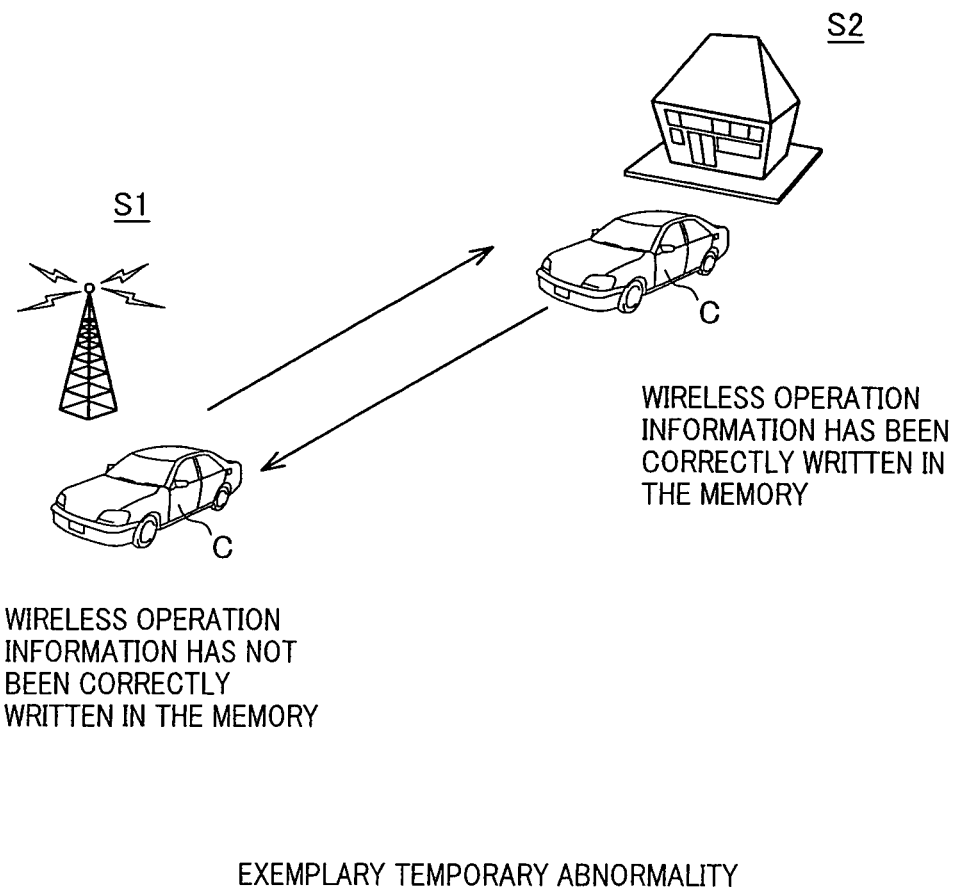
FIG. 3 is an exemplary scenario of a temporary abnormality where a usage embodiment rich in strong radio waves may cause erroneous writing of wireless operation information.

It should be noted that, in the presence of a continuous abnormality such as a fault in the vehicle fault detecting device itself, wireless operation information will not be correctly written in the memory 11 regardless of usage environments including the usage environments S1 and S2 as shown in FIG. 3.

In consideration of the above, in the present embodiment, the IG-operation counting unit 16 is operative to count a number of IG-operations N2, i.e., a number of times the IG-switch 20 is turned on, and the usage-environment-change determining unit 17 is operative to determine whether or not a number of continuous IG-operations N23 has reached a predetermined determination number N2th (N23 and N2th will be defined soon later). In cases where it is determined that the number of continuous IG-operations N23 has reached the predetermined determination number N2th, the usage-environment-change determining unit 17 is operative to presume that a usage environment around the vehicle C has changed. Even in cases where the number of times of continuous non-coincidence N1 has reached the determination number of times of continuous non-coincidence N1th, the data writing unit 12 is operative not to write occurrence of a fault in hardware unless the usage-environment-change determining unit 17 has presumed that the usage environment around the vehicle C has changed. This will now be explained in more detail in the following.

The IG-operation counting unit 16 is connected to the memory 11 and the IG-switch 20. Once the IG-operation counting unit 16 has received from the IG-switch 20 an IG-signal indicative of the IG-switch 20 having been ON-operated (or turned on), the IG-operation counting unit 16 accesses the storage area 114 of the memory 11 to replace a value which has been stored in the area 114 by the value plus, for example, "1". In this way, the IG-operation counting unit 16 counts a total number of times the IG-switch 20 is turned on. It should be noted that, in the present embodiment, the IG-operation counting unit 16 acts as the usage-environment-information acquiring unit.

The usage-environment-change determining unit 17 is connected to the memory 11 and the coincidence-of-data determining unit 14. Each time the coincidence-of-data determining unit 14 determines that the read wireless operation information is not coincident with the intended wireless operation information to be written in the memory 11 and then outputs the non-coincidence, the usage-environment-change determining unit 17, in response to it, accesses the storage area 113 of the memory 11 to read the number of times of continuous non-coincidence N1. When the number of times of continuous non-coincidence N1 read from the memory 11 is "1", the usage-environment-change determining unit 17 accesses the storage area 114 of the memory 11 to read the number of IG-switch operations N2, and then memorizes it as a number of IG-switch operations N21 at the time of the first determination of continuous non-coincidence. In addition, when the number of times of continuous non-coincidence N1 read from the memory 11 becomes "N1th (times)", the usage-environment-change determining unit 17 again accesses the storage area 114 of the memory 11 to read the number of IG-switch operations N2, and then memorizes it as a number of IG-switch operations N22 when the determination number N1th is reached. The usage-environment-change determining unit 17 then determines whether or not a number of continuous IG-switch operations N23 given by N22 minus N21 has reached a predetermined determination number of continuous IG-switch operations N2th. In cases where it is determined by the usage-environment-change determining unit 17 that the number of continuous IG-switch operations N23 has reached the determination number N2th (e.g., "2 (times)"), the usage-environment-change determining unit 17 presumes that the usage environment around the vehicle C has changed.

Even in cases where the number of times of continuous non-coincidence N1 has reached the determination number of times of continuous non-coincidence N1th, the data writing unit 12 is operative not to write occurrence of a fault in hardware in the storage area 112 of the memory 11 unless it is determined by the usage-environment-change determining unit 17 that the usage environment has changed during a time period from the time when the number of times of continuous non-coincidence N1 is 1 to the time when the number of times of continuous non-coincidence N1 becomes N1th.

In cases where it is determined that the number of continuous IG-switch operations N23 has reached the determination number of continuous IG-switch operations N2th, it can be presumed that the vehicle C equipped with the fault detecting device 1 has actually run a distance, and thus it is highly probable that the usage environment around the vehicle C has changed. Accordingly, comparing the number of continuous IG-switch operations N23 and the determination number of continuous IG-switch operations N2th makes it possible to more reliably and more accurately determine whether or not what has caused data different from the intended wireless operation information to be written in the memory 11 is a hardware fault. In addition, since the IG-switch is usually mounted on a vehicle with an internal-combustion engine, the above advantages can be provided without preparing a specific or dedicated device for detecting a usage environment change. Preferably, the number of IG-switch operations may be plural and the IG-switch operation counting unit may be a counter, such as a counting circuit.

Figure 2:
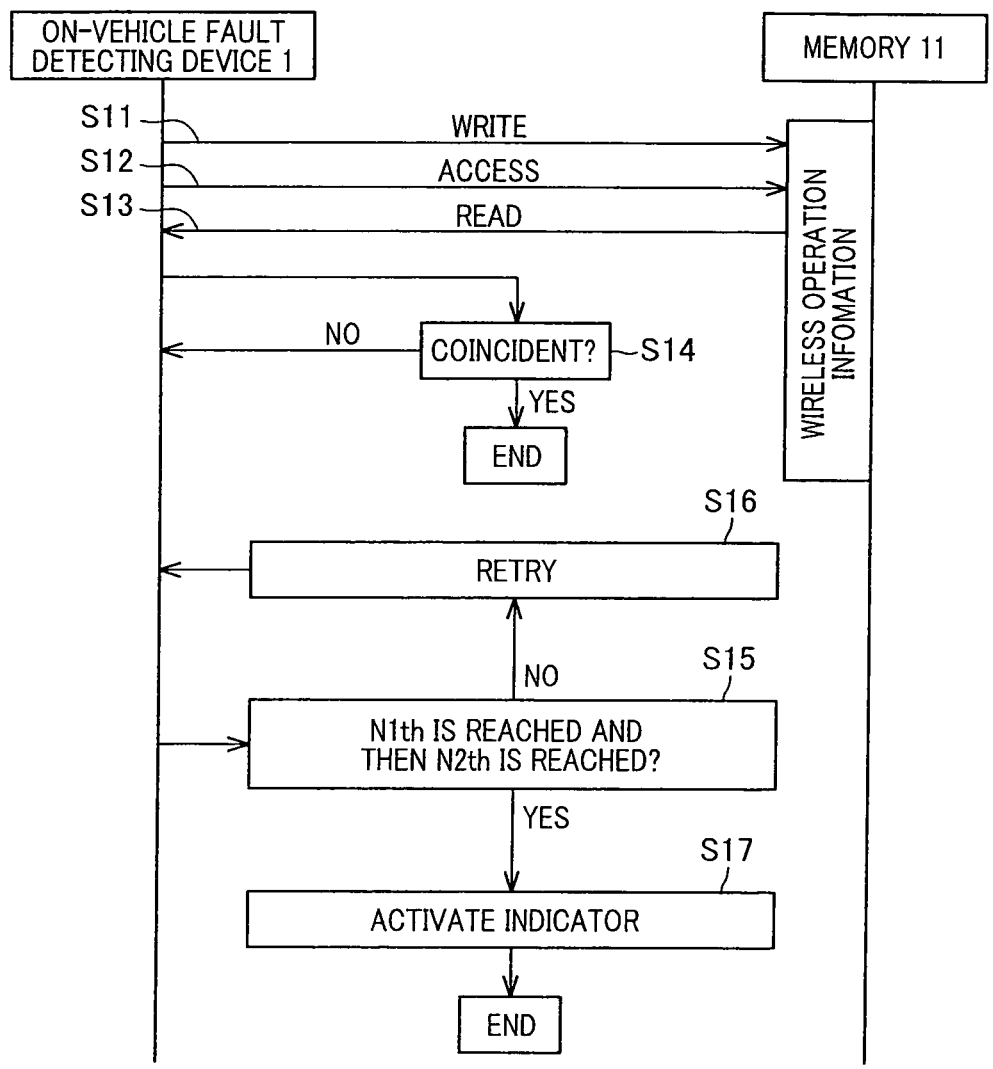
FIG. 2 is a flowchart schematically illustrating a data writing process in accordance with an embodiment of the present invention.

FIG. 2 is a flowchart schematically illustrating a data writing process. There will now be explained the data writing process with reference to FIG. 2. The data writing process starts with, for example, the lock button or the unlock button on the mobile device 30a being operated and then in response to it the vehicle door being locked or unlocked by the vehicle-side device 30b.

Once the data writing process has been started, the on-vehicle fault detecting device 1 (particularly, the data writing unit 12) accesses the storage area 111 of the memory 11 to write wireless operation information inputted from the vehicle-side device 30b at step S11.

After the wireless operation information has been written in the memory 11, the on-vehicle fault detecting device 1 (particularly, the data reading unit 13) accesses the storage area 111 of the memory 11 to read the stored wireless operation information at steps S12 and S13.

After the wireless operation information has been read from the memory 11, the on-vehicle fault detecting device 1 (particularly, the coincidence-of-data determining unit 14), at next step S14, determines whether or not the wireless operation information read at steps S12 and S13 is coincident with the wireless operation information intended to be written at step S11.

If the read wireless operation information is coincident with the intended wireless operation information ("YES" at step S14) where the wireless operation information has been correctly written in the memory 11, the on-vehicle fault detecting device 1 (particularly, the continuous-non-coincidence counting unit 15) resets the number of times of continuous non-coincidence N1 to zero and then ends the data writing process. If the read wireless operation information is not coincident with the intended wireless operation information ("NO" at step S14) where the wireless operation information has not been correctly written in the memory 11, the on-vehicle fault detecting device 1 (particularly, the continuous-non-coincidence counting unit 15) increments the number of times of continuous non-coincidence N1 by one and then proceeds to step S15.

If it is determined at step S14 that the read wireless operation information is not coincident with the intended wireless operation information ("NO" at step S14) and the number of times of continuous non-coincidence N1 becomes "1", then the on-vehicle fault detecting device 1 (particularly, the usage-environment-change determining unit 17) reads the number of IG-switch operations N2 from the storage area 114 of the memory 11, and memorizes it as the number of IG-switch operations N21 at the time of the first determination of continuous non-coincidence, i.e., the time when it is first determined that the read wireless operation information is not coincident with the intended wireless operation information in subsequent and continuous non-coincidence determinations. In addition, if it is determined at step S14 that the read wireless operation information is not coincident with the intended wireless operation information ("NO" at step S14) and the number of times of continuous non-coincidence N1 becomes "N1th", then the on-vehicle fault detecting device 1 (particularly, the usage-environment-change determining unit 17) reads the number of IG-switch operations N2 from the storage area 114 of the memory 11, and then memorizes it as the number of IG-switch operations N22 at the time when the determination number N1th is reached.

At next step S15, the on-vehicle fault detecting device 1 (particularly, the IG-operation counting unit 16 and the usage-environment-change determining unit 17) determines whether or not the number of times of continuous non-coincidence N1 has reached the determination number of times of continuous non-coincidence N1th and the number of continuous IG-switch operations N23 (=N22−N21≥0) has reached the determination number of continuous IG-switch operations N2th (e.g., "2" (two times)).

Unless the number of times of continuous non-coincidence N1 has reached the determination number of times of continuous non-coincidence N1th ("NO" at step S15), the on-vehicle fault detecting device 1 retries (or repeats) sequential steps S11-S14 at step S16. On the other hand, if the number of times of continuous non-coincidence N1 has reached the determination number of times of continuous non-coincidence N1th and then the number of continuous IG-switch operations N23 has reached the determination number of continuous IG-switch operations N2th ("NO" at step S15), the on-vehicle fault detecting device 1 presumes that the usage environment around the vehicle C has changed, and then at step S17 writes occurrence of a fault in hardware in the storage area 112 of the memory 11.

The embodiments set forth herein are presented in order to best explain the present invention and its particular application so as to enable those skilled in the art to make and/or use the present invention. However, those skilled in the art will recognize that the description has been presented for the purposes of illustration and example only. The description as set forth herein is not intended to be exhaustive or to limit the present invention to the precise form disclosed. Many modifications and variations are possible in light of the above teachings without departing from the spirit of the forthcoming claims.

In the above embodiment, each time the lock button or the unlock button on the user mobile device 30a is operated (e.g., turned or pushed or touched) for the vehicle-side device 30b to lock or unlock a vehicle door, the data writing unit 12 accesses the storage area 111 of the memory 11 to write wireless operation information inputted from the vehicle-side device 30b. The present invention, however, is not limited to such an embodiment. It should be noted, for example, that a voltage outputted from an on-vehicle battery (not shown) of the vehicle C may be temporarily lowered at the beginning of the vehicle engine start or when an on-vehicle motor (not shown) for locking or unlocking a vehicle door is driven to lock or unlock the vehicle door. Therefore, during the battery voltage being temporarily at a lower level for this reason, wireless operation information different from intended wireless operation information to be written may be erroneously written by the data writing unit 12. In some embodiments, to avoid such erroneous writing, the data writing unit 12 may perform a diagnosis mask process without writing the wireless operation information during the battery voltage being temporarily lowered.

In the aforementioned embodiment, the fault-information outputting unit 18 is operative to output that there has occurred a fault in hardware (or that there exists a fault in hardware) to the external of the vehicle C by writing the occurrence of a fault in hardware in the storage area 112 of the memory 11. However, in some embodiments, the fault-information outputting unit 18 may be operative to output the occurrence of a fault in hardware to the external of the vehicle C not only by writing it in the storage area 112 of the memory 11, but also by activating the indicator 40 to light or blink, by generating an audio alert through a speaker, or by activating a warning buzzer to beep.

Also, in cases where the on-vehicle fault detecting device 1 is mounted on the vehicle C equipped with an electronic key system, the fault-information outputting unit 18 may send a signal indicative of occurrence of a fault in hardware to the vehicle-side device 30b. On receipt of the signal, the vehicle-side device 30b may in turn transfer the signal to the user mobile device 30a via the wireless communication, and then the user mobile device 30a displays the occurrence of a fault in hardware on its display (not shown).

In cases where the on-vehicle fault detecting device 1 is mounted on the vehicle C equipped with an on-vehicle navigation device 70, the fault-information outputting unit 18 may send a signal indicative of occurrence of a fault in hardware to the on-vehicle navigation device 70. On receipt of the signal, the on-vehicle navigation device 70 may display the occurrence of a fault in hardware on its display or generate an audio alert through a speaker.

It can be envisaged that the on-vehicle fault detecting device 1 may not compose the fault-information outputting unit 18. In embodiments where the dedicated tool 50 is allowed to read that there has occurred a fault in hardware, for example, from the memory 11, the on-vehicle fault detecting device 1 may not have to send the occurrence of a fault in hardware to the external of the on-vehicle fault detecting device 1 through the fault-information outputting unit 18.

In the aforementioned embodiment, the IG-operation counting unit 16 has been used as the usage-environment-information acquiring unit. The present invention, however, is not limited to such an embodiment. There will now be described alternative embodiments.

Figure 1B:
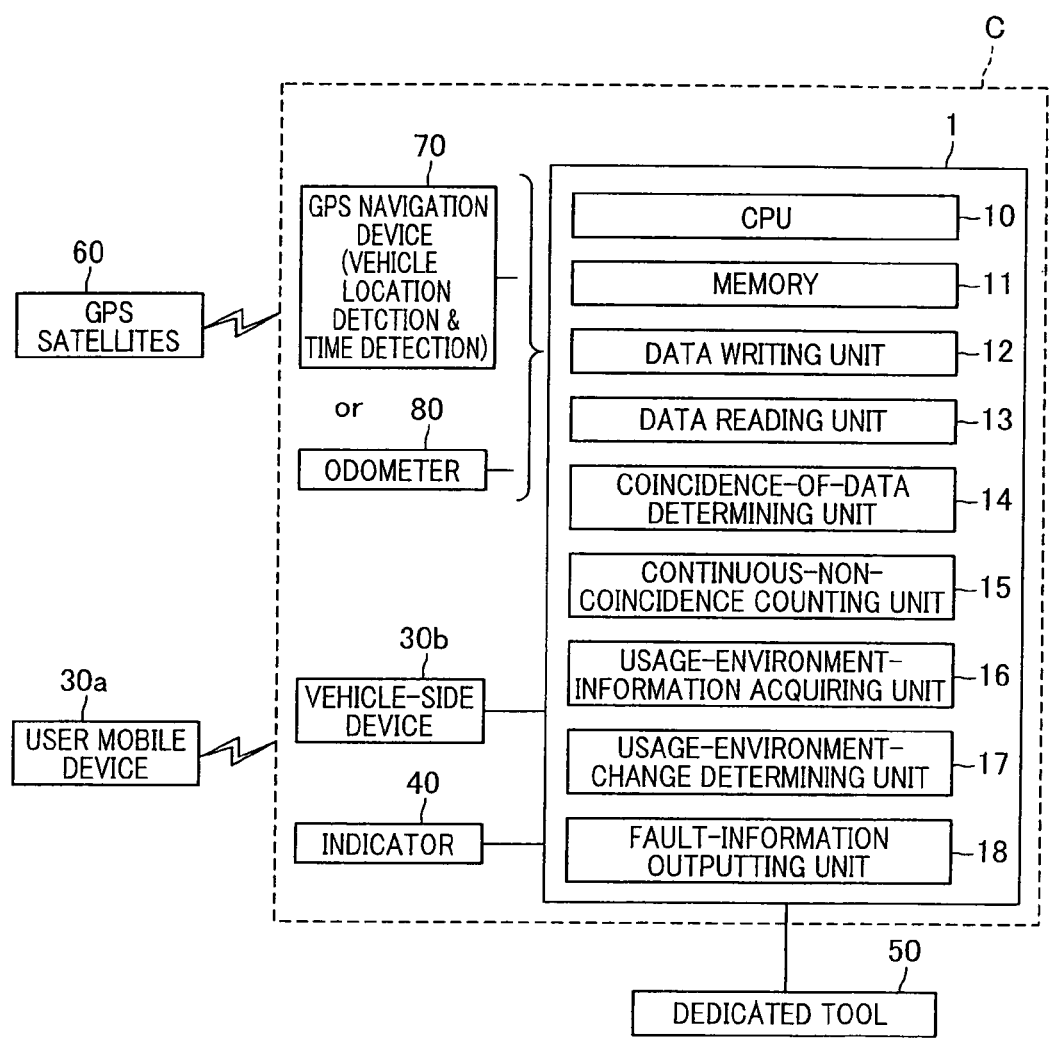
FIG. 1B is a block diagram schematically illustrating an on-vehicle fault detecting device in accordance with another embodiment of the present invention.

As shown in FIG. 1B, in another embodiment where the on-vehicle fault detecting device 1 is mounted on the vehicle C equipped with an on-vehicle navigation device 70 adapted to act as a vehicle location detecting unit that detects a vehicle location using GPS signals received from a plurality of GPS satellites and map information stored in an available memory or in a storage media, such as a DVD, a flash memory or a CD, the usage-environment-change determining unit 17 estimates a maximum separation distance from a vehicle location trajectory from the time of the first determination of continuous non-coincidence, i.e., the time of N1=1, to the time when the number of times of continuous non-coincidence N1 reaches (or becomes) the determination number N1th, i.e., the time of N1=N1th, on the basis of vehicle location information acquired from the on-vehicle navigation device 70, and then determines whether or not the estimated maximum separation distance is equal to or larger than a predetermined determination separation distance. In cases where it is determined that the maximum separation distance is equal to or larger than the determination separation distance, the usage-environment-change determining unit 17 presumes that the usage environment around the vehicle C has changed. It should be noted that in this embodiment the usage-environment-information acquiring unit 16 acquires the vehicle location information from the on-vehicle navigation device 70. In addition, the vehicle location detecting unit 70 may be operative to detect the vehicle location of the vehicle C at a higher frequency than the frequency at which the lock button or the unlock button on the user mobile device 30a is operated (e.g., turned or pushed or touched) for the vehicle-side device 30b to lock or unlock a vehicle door.

In cases where it is determined that the maximum separation distance is equal to or larger than the determination separation distance, it can be presumed that the vehicle C equipped with the on-vehicle fault detecting device 1 has largely changed its location, and thus it is highly probable that the usage environment around the vehicle C has changed.

Accordingly, comparing the maximum separation distance and the determination separation distance makes it possible to more reliably and more accurately determine whether or not what has caused wireless operation information different from intended-to-be-written wireless operation information to be written in the memory 11 is a hardware fault. Preferably, the determination separation distance may be a distance from the radio wave source such that the distance from the source is large enough to eliminate or nearly eliminate the possibility that strong radio waves from the source will cause wireless operation information different from the intended wireless operation information to be written in the memory 11.

Also as shown in FIG. 1B, in a further embodiment where the on-vehicle fault detecting device 1 is mounted on the vehicle C equipped with an on-vehicle navigation device 70 adapted to act as a time detecting unit that detects a time instant on the basis of a GPS signal received from a GPS satellite, the usage-environment-change determining unit 17 is operative to determine whether or not a lapsed time period from the time of the first determination of continuous non-coincidence, i.e., the time of N1=1, to the time when the number of times of continuous non-coincidence N1 reaches the determination number N1th, i.e., the time of N1=N1th, is equal to or larger than a predetermined determination time period on the basis of time information acquired form the time detecting unit 70 (i.e., the navigation device), and is operative to presume that the usage environment around the vehicle C has changed in cases where it is determined that the lapsed time period is equal to or larger than the determination time period. It should be noted that in this embodiment the usage-environment-information acquiring unit 16 acquires the time information (i.e., information about the time instant) from the on-vehicle navigation device 70.

Figure 1C:
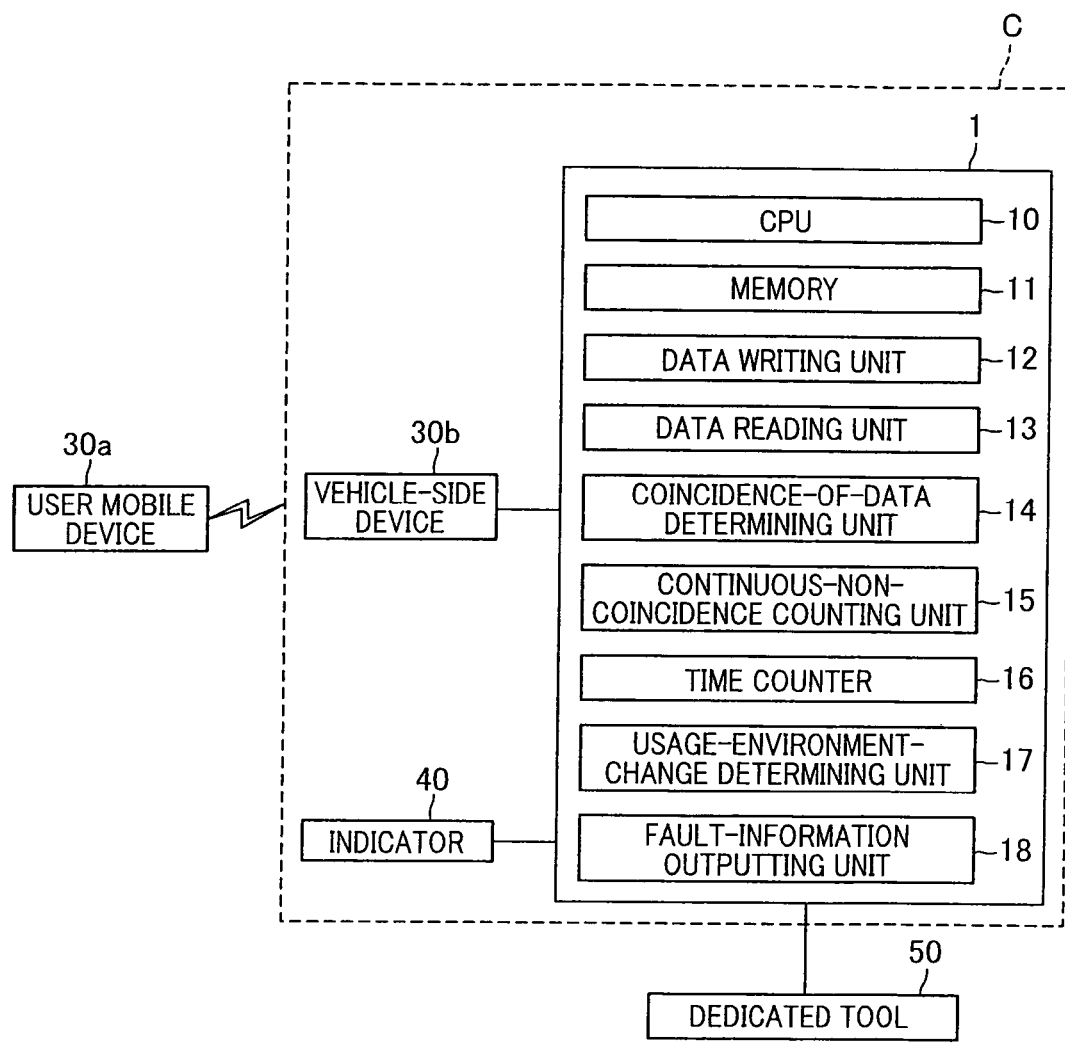
FIG. 1C is a block diagram schematically illustrating an on-vehicle fault detecting device in accordance with yet another embodiment of the present invention.

Alternatively, as shown in FIG. 1C, a time counter that counts a lapsed time period may be used as the usage-environment-information acquiring unit 16. The usage-environment-change determining unit 17 is operative to determine whether or not the lapsed time period from the time of the first determination of continuous non-coincidence, i.e., the time of N1=1, to the time when the number of times of continuous non-coincidence N1 reaches the determination number N1th, i.e., the time of N1=N1th, is equal to or larger than a predetermined determination time period on the basis of the lapsed time period acquired from the time counter 16, and is operative to presume that the usage environment around the vehicle C has changed in cases where it is determined that the lapsed time period is equal to or larger than the determination time period.

In cases where it is determined that the lapsed time period is equal to or larger than the determination time period, it can be presumed that the vehicle C equipped with the on-vehicle fault detecting device 1 has significantly changed its location as a result of having run a distance or that a strong radio wave emitting facility such as a manufacturing facility has stopped its operation to stop emitting the strong radio waves, and thus it is highly probable that the usage environment around the vehicle C has changed. Accordingly, comparing the lapsed time period and the determination time period makes it possible to more reliably and more accurately determine whether or not what has caused wireless operation information different from intended-to-be-written wireless operation information to be written in the memory 11 is a hardware fault. In this embodiment with the time counter 16 being used as the usage-environment-information acquiring unit, there can be achieved the same advantages as those achievable in the above embodiment where the vehicle C is equipped with the on-vehicle navigation device 70 acting as the time detecting device, without preparing such a navigation device. Preferably, the determination lapsed time period may be a time period larger than an operating time period of the manufacturing facility emitting the strong radio waves.

Also as shown in FIG. 1B, in a still further embodiment where the on-vehicle fault detecting device 1 is mounted on the vehicle C equipped with an on-vehicle navigation device 70 adapted to act as a vehicle location detecting unit that detects a vehicle location using GPS signals received from a plurality of GPS satellites and map information stored in an available memory or in a storage media, such as a DVD, a flash memory or a CD, the usage-environment-change determining unit 17 estimates an actual run-distance from the time of the first determination of continuous non-coincidence, i.e., the time of N1=1, to the time when the number of times of continuous non-coincidence N1 reaches the determination number N1th, i.e., the time of N1=N1th, and then determines whether or not the estimated actual run-distance is equal to or larger than a predetermined determination actual run-distance. In cases where it is determined that the actual run-distance is equal to or larger than the determination actual run-distance, it may be presumed that the usage environment around the vehicle C has changed. It should be noted that in this embodiment the usage-environment-information acquiring unit 16 acquires vehicle location information (i.e., information about the vehicle location) from the on-vehicle navigation device 70.

Also as shown in FIG. 1B, in an alternative embodiment where the on-vehicle fault detecting device 1 is mounted on the vehicle C equipped with an odometer 80, the usage-environment-change determining unit 17 determines whether or not an actual run-distance from the time of the first determination of continuous non-coincidence, i.e., the time of N1=1, to the time when the number of times of continuous non-coincidence N1 reaches the determination number N1th, i.e., the time of N1=N1th, is equal to or larger than a predetermined determination actual run-distance on the basis of actual run-distance information (i.e., information about the actual run-distance) acquired from the odometer 80, and then presumes that the usage environment around the vehicle C has changed in cases where it is determined that the actual run-distance is equal to or larger than the determination actual run-distance. It should be noted that in this embodiment the usage-environment-information acquiring unit 16 acquires the actual run-distance information from the odometer 80.

In cases where it is determined that the actual run-distance is equal to or larger than the determination actual run-distance, it can be presumed that the vehicle C equipped with the on-vehicle fault detecting device 1 has largely changed its location as a result of having run a distance, and thus it is highly probable that the usage environment around the vehicle C has changed. Accordingly, comparing the actual run-distance and the determination actual run-distance makes it possible to more reliably and more accurately determine whether or not what has caused wireless operation information different from intended-to-be-written wireless operation information to be written in the memory 11 is a hardware fault. Preferably, the determination actual run-distance may be a distance from the radio wave source such that the distance from the source is large enough to eliminate or nearly eliminate the possibility that strong radio waves from the source will cause wireless operation information different from the intended wireless operation information to be written in the memory 11. In another embodiment where the vehicle C is also equipped with a trip meter, actual run-distance information acquired from the trip meter may be used instead of the actual run-distance information acquired from the odometer 80.

In the aforementioned embodiments, the data writing unit 12 has been configured to write the wireless operation information in the memory 11. Data to be written by the data writing unit 12 in the memory 11, however, is not limited to the wireless operation information. Alternatively, the data writing unit 12 may be operative to write vehicle specification information in the memory 11. More generally, as will be recognized by those skilled in the art, arbitrary data may be written by the data writing unit 12 in the memory 11.

In the aforementioned embodiments, the usage-environment-change determining unit 17 has been configured to determine whether or not the usage environment has changed on the basis of the usage environment information acquired from the usage-environment-information acquiring unit 16, during a time period from the time of the first determination of continuous non-coincidence, i.e., the time of N1=1, to the time when the number of times of continuous non-coincidence N1 reaches the determination number N1th, i.e., the time of N1=N1th. The present invention is not limited to such embodiments. In some alternative embodiments, the usage-environment-change determining unit 17 may be operative to determine whether or not the usage environment has changed on the basis of the usage environment information acquired from the usage-environment-information acquiring unit 16 during a time period from the time when the data is read for the first determination of continuous non-coincidence to the time when the number of times of continuous non-coincidence N1 reaches the determination number N1th. As described above, the predetermined determination number of times of continuous non-coincidence N1th may be set to be "1" (i.e., once). In cases where the predetermined determination number of times of continuous non-coincidence N1th is set to be "1", data (or wireless operation information or vehicle specification information) is prohibited to be again written in the memory 11. In other words, the data writing unit 12 only has to write the data once (or retry to write the data) in the memory 11 whether or not the data has been correctly written in the memory 11.

In the aforementioned embodiments, the on-vehicle fault detecting device 1 have the embedded memory 11 to store data, and has been configured to write data in and read data from the embedded memory 11. The present invention is not limited to such embodiments. In some alternative embodiments, the on-vehicle fault detecting device 1 may be operative to write data in an available memory mounted on the vehicle C, such as a memory of the on-vehicle navigation device 70. In other words, the memory 11 may be inside or outside the on-vehicle fault detecting device 1.

In the aforementioned embodiments, the on-vehicle fault detecting device 1 has been configured to determine whether or not data has been correctly written in the memory 11. In some other embodiments, the on-vehicle fault detecting device 1 may be configured to determine whether or not data has been correctly read from the memory 11.

Figure 1D:
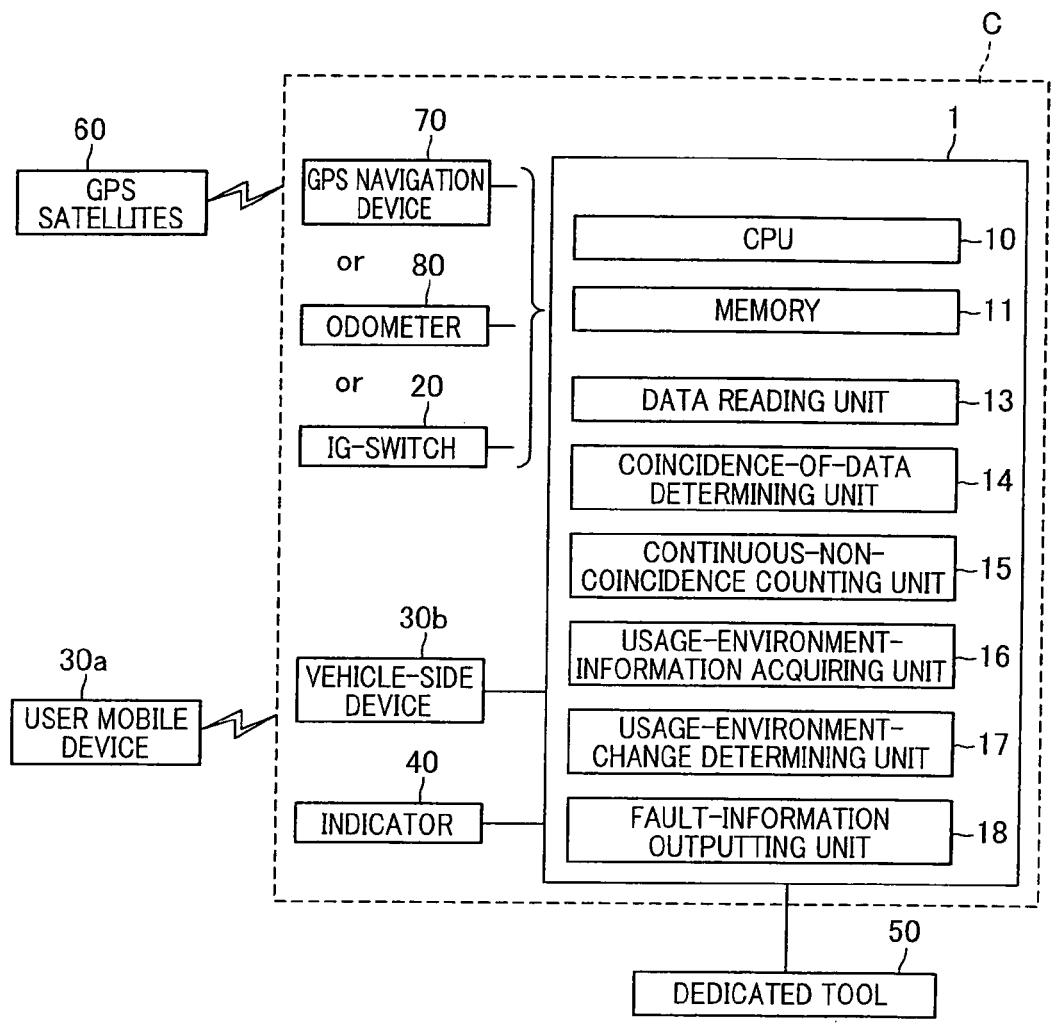
FIG. 1D is a block diagram schematically illustrating an on-vehicle fault detecting device in accordance with a further embodiment of the present invention.
Figure 1E:
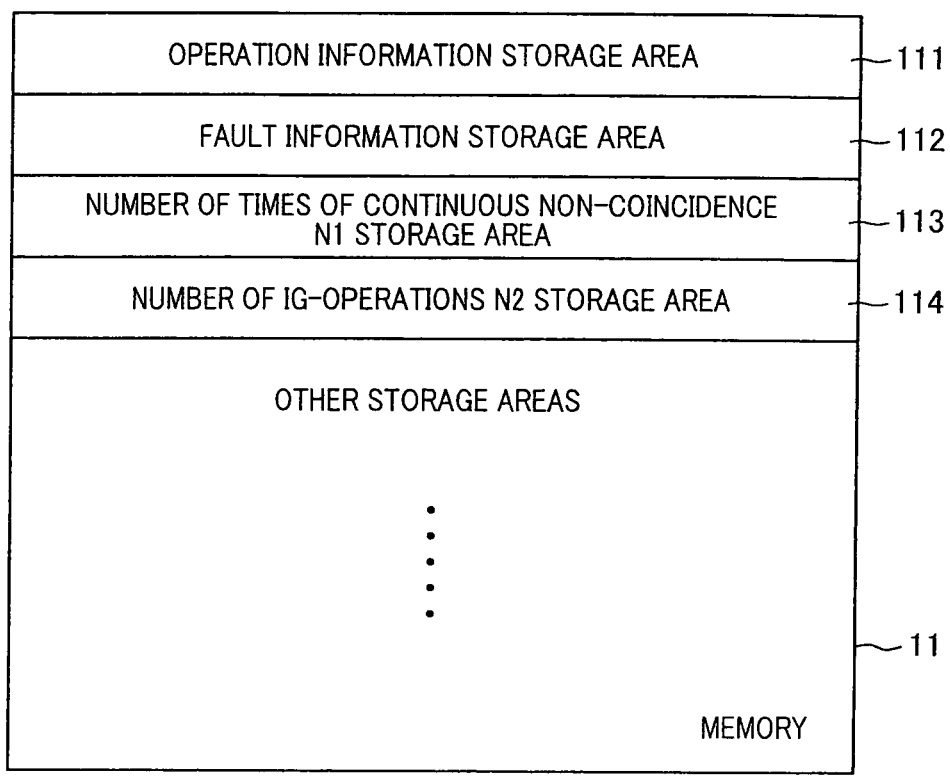
FIG. 1E is a block diagram schematically illustrating a memory including a plurality of storage areas in accordance with an embodiment of the present invention.

Specifically, in the aforementioned embodiments, the on-vehicle fault detecting device 1 determines whether or not data read by the data reading unit 13 is coincident with data intended to be written by the data writing unit 12, and then even in cases where it is determined that the read data is not coincident with the intended-to-be-written data, determines there has occurred a hardware fault unless it is determined that the usage environment around the vehicle C has changed. The present invention, however, is not limited to such embodiments. In alternative embodiments, the on-vehicle fault detecting device 1 may be operative to determine whether or not data read by the data reading unit 13 is coincident with predetermined data that should have been written in the memory (i.e., predetermined wireless operation information), and then even in cases where it is determined that the read data is not coincident with the predetermined data, may be operative to determine there has occurred a hardware fault unless it is determined that the usage environment around the vehicle C has changed. In such embodiments, as shown in FIG. 1D, the on-vehicle fault detecting device 1 may not include the data writing unit 12.

Japanese Patent Application Publication No. 2009-227250 discloses an apparatus that is operative to presume that there has occurred a fault in an ECU in cases where an in-vehicle LAN communication unit receives fault information transmitted from the ECU through an in-vehicle LAN. In cases where the fault information has been continuously received during a time period from the time of the first reception of the fault information to the time when the vehicle has run a predetermined distance, the apparatus is operative to determine that there has occurred a fault in the ECU. In other words, this apparatus is operative to determine whether or not there has occurred a hardware fault by determining whether or not the fault information has been continuously received during the vehicle being running the predetermined distance.

The present invention improves such a technique to be also applicable to cases where the vehicle is not running. According to the present invention, it can be more reliably and more accurately determined whether or not what has caused data different from intended data to be written in the memory is a hardware fault by determining whether or not the usage environment around the vehicle has changed. And it can be presumed that the usage environment has changed when there has occurred a predetermined change in time or in vehicle location. Accordingly, without the vehicle actually running, it can be determined whether or not there has occurred a fault in hardware by determining whether or not there has occurred the predetermined change in time or in vehicle location.

What is claimed is:

1. An on-vehicle fault detecting device for detecting whether or not there has occurred a fault in the device itself or in its hardware component, the device comprising:
    data writing means for writing data in a memory;
    data reading means for reading data written in the memory:
    coincidence-of-data determining means for determining whether or not the data read by the data reading means from the memory is coincident with data intended to be written by the data writing means in the memory, wherein the device is operative to determine that there has occurred a hardware fault only in cases where the coincidence-of-data determining means determines that the read data is not coincident with the intended data to be written;
    usage-environment-information acquiring means for acquiring information about a usage environment around a vehicle equipped with the device;
    usage-environment-change determining means for determining whether or not the usage environment around the vehicle has changed on the basis of the usage environment information acquired by the usage-environment-information acquiring means, while it is continuously determined by the coincidence-of-data determining means that the read data is not coincident with the intended data to be written; and
    continuous-non-coincidence counting means for counting a number of times that the coincidence-of-data determining means continuously determines that the read data is not coincident with the intended data (hereinafter, also referred to as a number of times of continuous non-coincidence), wherein
    even in cases where the coincidence-of-data determining means has determined that the read data is not coincident with the intended data to be written, the device is operative not to determine that there has occurred a hardware fault unless the usage-environment-change determining means determines that the usage environment has changed;
    the data writing means is operative to again write the data in the memory, unless the number of times of continuous non-coincidence has reached a predetermined determination number of times of continuous non-coincidence, and
    the usage-environment-change determining means is operative to determine whether or not the usage environment around the vehicle has changed during a time period from the time of the first determination of continuous non-coincidence to the time when the number of times of continuous non-coincidence reaches the determination number of times of continuous non-coincidence, on the basis of the usage environment information acquired by the usage-environment-information acquiring means.

2. An on-vehicle fault detecting device for detecting whether or not there has occurred a fault in the device itself or in its hardware component, the device comprising:
    data writing means for writing data in a memory;
    data reading means for reading data written in the memory;
    coincidence-of-data determining means for determining whether or not the data read by the data reading means from the memory is coincident with data intended to be written by the data writing means in the memory, wherein the device is operative to determine that there has occurred a hardware fault only in cases where the coincidence-of-data determining means determines that the read data is not coincident with the intended data to be written;
    usage-environment-information acquiring means for acquiring information about a usage environment around a vehicle equipped with the device; and
    usage-environment-change determining means for determining whether or not the usage environment around the vehicle has changed on the basis of the usage environment information acquired by the usage-environment-information acquiring means, while it is continuously determined by the coincidence-of-data determining means that the read data is not coincident with the intended data to be written; and
    continuous-non-coincidence counting means for counting a number of times that the coincidence-of-data determining means continuously determines that the read data is not coincident with the intended data (hereinafter, also referred to as a number of times of continuous non-coincidence), wherein
    even in cases where the coincidence-of-data determining means has determined that the read data is not coincident with the intended data to be written, the device is operative not to determine that there has occurred a hardware fault unless the usage-environment-change determining means determines that the usage environment has changed;
    the data reading means is operative to again read the written data from the memory, unless the number of times of continuous non-coincidence has reached a predetermined determination number of times of continuous non-coincidence, and the usage-environment-change determining means is operative to determine whether or not the usage environment around the vehicle has changed during a time period from the time of the first determination of continuous non-coincidence to the time when the number of times of continuous non-coincidence reaches the determination number of times of continuous non-coincidence, on the basis of the usage environment information acquired by the usage-environment-information acquiring means.

3. The device of claim 1, wherein
the usage-environment-information acquiring means comprises ignition switch (IG-switch) operation counting means for counting a number of IG-switch operations by acquiring an IG-signal that indicates that the IG-switch has been operated, and the usage-environment-change determining means is operative to determine whether or not an increased number of IG-switch operations during a time period from the time of the first determination of continuous non-coincidence to the time when the number of times of continuous non-coincidence reaches the determination number of times of continuous non-coincidence has reached a predetermined determination number of IG-switch operations on the basis of the number of IG-switch operations counted by the IG-switch operation counting means, and is operative to presume that the usage environment has changed if it is determined that the increased number of IG-switch operations has reached the determination number of IG-switch operations.

4. The device of claim 2, wherein
the usage-environment-information acquiring means comprises ignition switch (IG-switch) operation counting means for counting a number of IG-switch operations by acquiring an IG-signal that indicates that the IG-switch has been operated, and the usage-environment-change determining means is operative to determine whether or not an increased number of IG-switch operations during a time period from the time of the first determination of continuous non-coincidence to the time when the number of times of continuous non-coincidence reaches the determination number of times of continuous non-coincidence has reached a predetermined determination number of IG-switch operations on the basis of the number of IG-switch operations counted by the IG-switch operation counting means, and is operative to presume that the usage environment has changed if it is determined that the increased number of IG-switch operations has reached the determination number of IG-switch operations.

5. The device of claim 1, wherein
the vehicle is equipped with vehicle-location detecting means for detecting a vehicle location on the basis of GPS signals received from a plurality of GPS satellites and map information, the usage-environment-information acquiring means is operative to acquire vehicle location information from the vehicle-location detecting means, and the usage-environment-change determining means is operative to determine whether or not a maximum separation distance between the vehicle locations during a time period from the time of the first determination of continuous non-coincidence to the time when the number of times of continuous non-coincidence reaches the determination number of times of continuous non-coincidence is equal to or larger than a predetermined determination separation distance on the basis of the vehicle location information acquired by the usage-environment-information acquiring means, and is operative to presume that the usage environment has changed if it is determined that the maximum separation distance is equal to or larger than the determination separation distance.

6. The device of claim 2, wherein
the vehicle is equipped with vehicle-location detecting means for detecting a vehicle location on the basis of GPS signals received from a plurality of GPS satellites and map information, the usage-environment-information acquiring means is operative to acquire vehicle location information from the vehicle-location detecting means, and the usage-environment-change determining means is operative to determine whether or not a maximum separation distance between the vehicle locations during a time period from the time of the first determination of continuous non-coincidence to the time when the number of times of continuous non-coincidence reaches the determination number of times of continuous non-coincidence is equal to or larger than a predetermined determination separation distance on the basis of the vehicle location information acquired by the usage-environment-information acquiring means, and is operative to presume that the usage environment has changed if it is determined that the maximum separation distance is equal to or larger than the determination separation distance.

7. The device of claim 1, wherein
the vehicle is equipped with a time detecting means for detecting a time instant on the basis of a GPS signal received from a GPS satellite, the usage-environment-information acquiring means is operative to acquire time information from the time detecting means, and the usage-environment-change determining means is operative to determine whether or not a lapsed time period from the time of the first determination of continuous non-coincidence to the time when the number of times of continuous non-coincidence reaches the determination number of times of continuous non-coincidence is equal to or larger than a predetermined determination time period on the basis of the time information acquired by the usage-environment-information acquiring means, and is operative to presume that the usage environment has changed if it is determined that the lapsed time period is equal to or larger than the determination time period.

8. The device of claim 2, wherein
the vehicle is equipped with a time detecting means for detecting a time instant on the basis of a GPS signal received from a GPS satellite, the usage-environment-information acquiring means is operative to acquire time information from the time detecting means, and the usage-environment-change determining means is operative to determine whether or not a lapsed time period from the time of the first determination of continuous non-coincidence to the time when the number of times of continuous non-coincidence reaches the determination number of times of continuous non-coincidence is equal to or larger than a predetermined determination time period on the basis of the time information acquired by the usage-environment-information acquiring means, and is operative to presume that the usage environment has changed if it is determined that the lapsed time period is equal to or larger than the determination time period.

9. The device of claim 1, wherein
the usage-environment-information acquiring means comprises a time counter that counts a lapsed time period,
the usage-environment-change determining means is operative to determine whether or not a lapsed time period from the time of the first determination of continuous non-coincidence to the time when the number of times of continuous non-coincidence reaches the determination number of times of continuous non-coincidence is equal to or larger than a predetermined determination time period on the basis of the lapsed time period counted by the time counter, and is operative to presume that the usage environment has changed if it is determined that the lapsed time period is equal to or larger than the determination time period.

10. The device of claim 2, wherein
the usage-environment-information acquiring means comprises a time counter that counts a lapsed time period,
the usage-environment-change determining means is operative to determine whether or not a lapsed time period from the time of the first determination of continuous non-coincidence to the time when the number of times of continuous non-coincidence reaches the determination number of times of continuous non-coincidence is equal to or larger than a predetermined determination time period on the basis of the lapsed time period counted by the time counter, and is operative to presume that the usage environment has changed if it is determined that the lapsed time period is equal to or larger than the determination time period.

11. The device of claim 1, wherein
the vehicle is equipped with a vehicle location detecting means for detecting a vehicle location on the basis of GPS signals received from a plurality of GPS satellites and map information,
the usage-environment-information acquiring means is operative to acquire vehicle location information from the vehicle location detecting means, and
the usage-environment-change determining means is operative to determine whether or not an actual run-distance during a time period from the time of the first determination of continuous non-coincidence to the time when the number of times of continuous non-coincidence reaches the determination number of times of continuous non-coincidence is equal to or larger than a predetermined determination run-distance on the basis of the vehicle location information acquired by the usage-environment-information acquiring means, and is operative to presume that the usage environment has changed if it is determined that the actual run-distance is equal to or larger than the determination run-distance.

12. The device of claim 2, wherein
the vehicle is equipped with a vehicle location detecting means for detecting a vehicle location on the basis of GPS signals received from a plurality of GPS satellites and map information,
the usage-environment-information acquiring means is operative to acquire vehicle location information from the vehicle location detecting means, and
the usage-environment-change determining means is operative to determine whether or not an actual run-distance during a time period from the time of the first determination of continuous non-coincidence to the time when the number of times of continuous non-coincidence reaches the determination number of times of continuous non-coincidence is equal to or larger than a predetermined determination run-distance on the basis of the vehicle location information acquired by the usage-environment-information acquiring means, and is operative to presume that the usage environment has changed if it is determined that the actual run-distance is equal to or larger than the determination run-distance.

13. The device of claim 1, wherein
the vehicle is equipped with an odometer,
the usage-environment-information acquiring means is operative to acquire actual run-distance information from the odometer, and
the usage-environment-change determining means is operative to determine whether or not an actual run-distance during a time period from the time of the first determination of continuous non-coincidence to the time when the number of times of continuous non-coincidence reaches the determination number of times of continuous non-coincidence is equal to or larger than a predetermined determination run-distance on the basis of the actual run-distance information acquired by the usage-environment-information acquiring means, and is operative to presume that the usage environment has changed if it is determined that the actual run-distance is equal to or larger than the determination run-distance.

14. The device of claim 2, wherein
the vehicle is equipped with an odometer,
the usage-environment-information acquiring means is operative to acquire actual run-distance information from the odometer, and
the usage-environment-change determining means is operative to determine whether or not an actual run-distance during a time period from the time of the first determination of continuous non-coincidence to the time when the number of times of continuous non-coincidence reaches the determination number of times of continuous non-coincidence is equal to or larger than a predetermined determination run-distance on the basis of the actual run-distance information acquired by the usage-environment-information acquiring means, and is operative to presume that the usage environment has changed if it is determined that the actual run-distance is equal to or larger than the determination run-distance.

15. An on-vehicle fault detecting device for detecting whether or not there has occurred a fault in the device or in its hardware itself, the device comprising:
data reading means for reading data written in a memory;
coincidence-of-data determining means for determining whether or not data read by the data reading means from the memory is coincident with predetermined data, wherein the device is operative to determine that there has occurred a hardware fault only in cases where the coincidence-of-data determining means determines that the read data is not coincident with the predetermined data;
usage-environment-information acquiring means for acquiring information about a usage environment around a vehicle equipped with the device; and
usage-environment-change determining means for determining whether or not the usage environment around the vehicle has changed on the basis of the usage environment information acquired by the usage-environment-information acquiring means, while it is continuously determined by the coincidence-of-data determining means that the read data is not coincident with the predetermined data, continuous-non-coincidence counting means for counting a number of times that the coincidence-of-data determining means continuously determines that the read data is not coincident with the predetermined data (hereinafter, also referred to as a number of times of continuous non-coincidence), wherein even in cases where the coincidence-of-data determining means has determined that the read data is not coincident with the predetermined data, the device is operative not to determine that there has occurred a hardware fault unless the usage-environment-change determining means determines that the usage environment has changed the data reading means is operative to again read the written data from the memory, unless the number of times of continuous non-coincidence has reached a predetermined determination number of times of continuous non-coincidence, and the usage-environment-change determining means is operative to determine whether or not the usage environment around the vehicle has changed during a time period from the time of the first determination of continuous non-coincidence to the time when the number of times of continuous non-coincidence reaches the determination number of times of continuous non-coincidence, on the basis of the usage environment information acquired by the usage-environment-information acquiring means.

16. The device of claim 15, wherein
the usage-environment-information acquiring means comprises ignition switch (IG-switch) operation counting means for counting a number of IG-switch operations by acquiring an IG-signal that indicates that the IG-switch has been operated, and
the usage-environment-change determining means is operative to determine whether or not an increased number of IG-switch operations during a time period from the time of the first determination of continuous non-coincidence to the time when the number of times of continuous non-coincidence reaches the determination number of times of continuous non-coincidence has reached a predetermined determination number of IG-switch operations on the basis of the number of IG-switch operations counted by the IG-switch operation counting means, and is operative to presume that the usage environment has changed if it is determined that the increased number of IG-switch operations has reached the determination number of IG-switch operations.

17. The device of claim 15, wherein
the vehicle is equipped with vehicle-location detecting means for detecting a vehicle location on the basis of GPS signals received from a plurality of GPS satellites and map information,
the usage-environment-information acquiring means is operative to acquire vehicle location information from the vehicle-location detecting means, and
the usage-environment-change determining means is operative to determine whether or not a maximum separation distance between the vehicle locations during a time period from the time of the first determination of continuous non-coincidence to the time when the number of times of continuous non-coincidence reaches the determination number of times of continuous non-coincidence is equal to or larger than a predetermined determination separation distance on the basis of the vehicle location information acquired by the usage-environment-information acquiring means, and is operative to presume that the usage environment has changed if it is determined that the maximum separation distance is equal to or larger than the determination separation distance.

18. The device of claim 15, wherein
the vehicle is equipped with a time detecting means for detecting a time instant on the basis of a GPS signal received from a GPS satellite,
the usage-environment-information acquiring means is operative to acquire time information from the time detecting means, and
the usage-environment-change determining means is operative to determine whether or not a lapsed time period from the time of the first determination of continuous non-coincidence to the time when the number of times of continuous non-coincidence reaches the determination number of times of continuous non-coincidence is equal to or larger than a predetermined determination time period on the basis of the time information acquired by the usage-environment-information acquiring means, and is operative to presume that the usage environment has changed if it is determined that the lapsed time period is equal to or larger than the determination time period.

19. The device of claim 15, wherein
the usage-environment-information acquiring means comprises a time counter that counts a lapsed time period,
the usage-environment-change determining means is operative to determine whether or not a lapsed time period from the time of the first determination of continuous non-coincidence to the time when the number of times of continuous non-coincidence reaches the determination number of times of continuous non-coincidence is equal to or larger than a predetermined determination time period on the basis of the lapsed time period counted by the time counter, and is operative to presume that the usage environment has changed if it is determined that the lapsed time period is equal to or larger than the determination time period.

20. The device of claim 15, wherein
the vehicle is equipped with vehicle location detecting means for detecting a vehicle location on the basis of GPS signals received from a plurality of GPS satellites and map information,
the usage-environment-information acquiring means is operative to acquire vehicle location information from the vehicle location detecting means, and
the usage-environment-change determining means is operative to determine whether or not an actual run-distance during a time period from the time of the first determination of continuous non-coincidence to the time when the number of times of continuous non-coincidence reaches the determination number of times of continuous non-coincidence is equal to or larger than a predetermined determination run-distance on the basis of the vehicle location information acquired by the usage-environment-information acquiring means, and is operative to presume that the usage environment has changed if it is determined that the actual run-distance is equal to or larger than the determination run-distance.

21. The device of claim 15, wherein
the vehicle is equipped with an odometer,
the usage-environment-information acquiring means is operative to acquire actual run-distance information from the odometer, and
the usage-environment-change determining means is operative to determine whether or not an actual run-distance during a time period from the time of the first determination of continuous non-coincidence to the time when the number of times of continuous non-coincidence reaches the determination number of times of continuous non-coincidence is equal to or larger than a predetermined determination run-distance on the basis of the actual run-distance information acquired by the usage-environment-information acquiring means, and is operative to presume that the usage environment has changed if it is determined that the actual run-distance is equal to or larger than the determination run-distance.

22. The device of claim 1, wherein
the vehicle is equipped with a vehicle-side device that locks and unlocks a vehicle door through a wireless communication with a corresponding mobile device at a user side, and
the data writing means is operative to write wireless operation information about operations on the mobile device as the data in the memory each time the vehicle door is locked or unlocked by the vehicle-side device.

23. The device of claim 1, further comprising fault information outputting means for outputting occurrence of a fault in hardware to the external of the device once it is determined that there has occurred the hardware fault.

24. The device of claim 15, further comprising fault information outputting means for outputting occurrence of a fault in hardware to the external of the device once it is determined that there has occurred the hardware fault.

25. The device of claim 2, wherein
the vehicle is equipped with a vehicle-side device that locks and unlocks a vehicle door through a wireless communication with a corresponding mobile device at a user side, and
the data writing means is operative to write wireless operation information about operations on the mobile device as the data in the memory each time the vehicle door is locked or unlocked by the vehicle-side device.

26. The device of claim 2, further comprising fault information outputting means for outputting occurrence of a fault in hardware to the external of the device once it is determined that there has occurred the hardware fault.

\* \* \* \* \*